May 15, 1951 A. W. LEMMON 2,552,897
CENTER LINK FOR RIVETLESS CHAINS
Original Filed Jan. 19, 1945 2 Sheets-Sheet 2

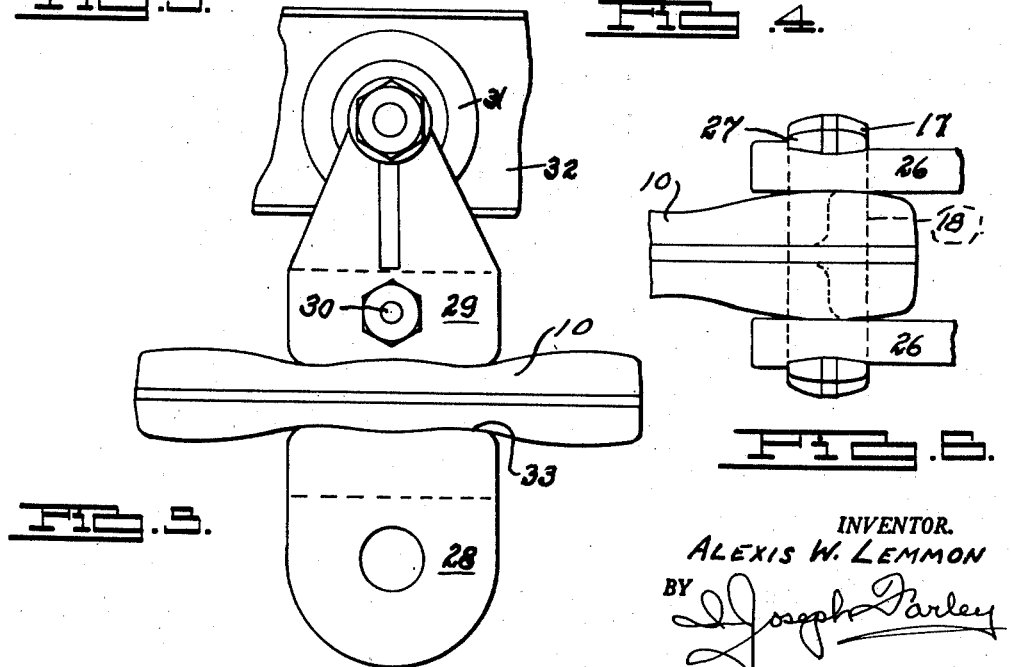

INVENTOR.
ALEXIS W. LEMMON
BY
ATTORNEY

Patented May 15, 1951

2,552,897

UNITED STATES PATENT OFFICE 2,552,897

CENTER LINK FOR RIVETLESS CHAINS

Alexis W. Lemmon, Upper Arlington, Ohio, assignor to Jervis B. Webb Company, Detroit, Mich., a corporation of Michigan Original application January 19, 1945, Serial No. 573,517, now Patent No. 2,507,025, dated May 9, 1950. Divided and this application November 22, 1946, Serial No. 711,590

2 Claims. (Cl. 198—177)

This invention relates to a particular type of chain variously called "Keystone," "Rivetless" or "Weston" chain which for many years has had wide application in conveyors, mining machinery and other industrial uses as well as a trolley conveyor bracket adapted to be engaged by such chain as in moving a trolley along a conveyor track.

The original rivetless chain was the subject matter of Weston Patent No. 870,704. In addition to its great strength, its principal features are its adaptability as a sprocket chain, the absence of rivets, and the ease with which individual links may be removed from or added to the chain. The adaptation of this type of chain in providing a power drive for a trolley conveyor line as disclosed in the patent to Jervis B. Webb, No. 1,729,759, has found wide application in the conveyor industry. This invention is directed to certain improvements in the Weston chain and in the trolley conveyor bracket driven by such chain having for their object the strengthening of the chain to improve the functioning thereof in operation, the incorporation of a self-centering feature between the chain and trolley bracket and to effect certain economies in the cost of fabricating the same; this application being a division of my prior application, Serial No. 573,517, filed January 19, 1945, and now Patent No. 2,507,025, granted May 9, 1950.

The original rivetless chain to which the present invention is directed and which formed the subject matter of the Weston Patent No. 870,704 consists of a plurality of alternately arranged "center links" and "side bars" as they are termed in the art. Each center link consists of an integral piece of metal having a pair of laterally spaced side walls joined at their ends by curved end walls, said side and end walls enclosing or surrounding an elongated slot. A pair of side bars each having an elongated slot at each end is pivotally connected to each end of each center link by headed pins, each pin having a transverse head on each end thereof similar to the headed end of a T-head machine bolt. The side bars are formed at their ends with transversely extending recesses on their outer faces in which the heads of the pins are seated to lock the pins in position after the center links and side bars have been coupled together. Each of the center links has a narrowed central portion which tapers outwardly adjacent to the ends of the link to form thickened portions at the link ends. The center links and side bars are assembled by holding the elongated slots in the ends of a pair of side bars one on each side of the center link at the central portion of the elongated slot of the center link and in parallelism therewith, then inserting the headed end at one end of a headed pin through the three slots, next turning the side bars at a right angle to the center link and seating the heads of the pins in the transverse recesses formed in the ends of the side bars, after which the pair of side bars and the headed pin are slid toward the thickened end portion of the center link whereby said thickened portion holds the side bars spread apart sufficiently to maintain the transverse T-heads on each pin within the transverse recesses in the outer faces of the side bars, thus holding the side bars and center links pivotally secured together. When the center links and side bars are so assembled to form a length of chain, the side bars and center links are arranged in alternate relationship along said chain, each center link having connected to each end thereof a pair of spaced side bars and each such pair of side bars being connected at each end to an adjacent center link and so that pivotal movement is permitted between the adjacent center links and side bars about the center of said headed pins as an axis.

In the original Weston chain the center links thereof, although made as forgings, have the general form that would result if a flat piece of steel approximately $\frac{5}{16}$ of an inch in thickness were bent to form an elongated link having the ends thereof curved and so that the inner face of the bar at each end of the link forms a substantially semi-cylindrical bearing surface for the body portion of the connecting headed pin.

In the original Weston chain the end portions of the center links, as shown in the Weston Patent No. 870,704 are approximately twice as wide as the central portion of the link and the bar-like piece of metal which forms the link is provided with a comparatively sharply inclined section or taper where the wider end portions connect with the thinner central portion thereof; the top and bottom surfaces of the wider end portions of the links being formed as flat or plane surfaces for engagement by the inner faces of the side bars. Except for a slight tapering of the side walls of the bar of material from the longitudinal center thereof to the top and bottom faces for providing the necessary draft for the forging dies, the bar of material which formed the link was of substantially uniform cross-sectional thickness as distinguished from a uniform width of the bar as just described to provide the wider end portions thereof.

It has been found in practice that the weakest point of the keystone chain and the point at which most failures have occurred is at the comparatively sharp line that marks the demarcation between the thinner central section of the link and the tapered section thereof which connects the wider end portion of the link with the said central thinner section.

One of the principal objects of the present invention therefore is to provide a new and improved construction whereby there will be no sharp line of demarcation to form a cleavage line as with the Weston chain as heretofore universally constructed.

As noted above, large quantities of the Weston or keystone chain have been used for many years in overhead trolley installations in which the chain is supported for movement along a supporting load-carrying I-beam track by means of trolley brackets such as disclosed in the patent to Jervis B. Webb, No. 1,729,759. As shown in the said Webb patent, a pair of similar bracket members are provided each having an outwardly flaring upper portion having a trolley wheel rotatably mounted thereon for engaging the lower flange of the I-beam and a lower central portion through which and the flat web of a load-supporting clevis or hook member, bolts are passed to secure the two bracket members and the load-supporting member in assembled condition, the flat web of the clevis or load-supporting member passing through the elongated slot of the center link so that when the two bracket members and load-supporting member are secured together, the brackets are held in assembled relation to the I-beam supporting track and to the chain; the bracket thus serving to hold the chain suspended from the supporting track and so that the weight of the loads which are being supported is carried entirely by the bracket members and track without any of the load being transmitted to the chain which serves entirely as a traction device to propel the trolley brackets and loads along the track.

A further object of the present invention is to so construct the center link of a keystone chain as to provide locating surfaces thereon which will cooperate with similarly formed surfaces on a bracket of the type shown in the said Webb patent in such a manner that the bracket members and center link of the chain will be rendered automatically self-centering when the parts are assembled.

The above and other objects of the invention will appear more fully from the following more detailed description and by reference to the accompanying drawings forming a part hereof and wherein:

Fig. 1 is a side elevation of a center link for a Weston or keystone chain and constructed in accordance with the principles of the present invention;

Fig. 2 is a plan view of the structure shown in Fig. 1;

Fig. 3 is an enlarged sectional detail taken on the line 3—3 of Fig. 2;

Fig. 4 is a similar enlarged cross-sectional detail taken on the line 4—4 of Fig. 1;

Fig. 5 is a side elevation of a center link and trolley bracket in assembled condition, and Fig. 6 is a side elevation showing the manner in which a center link and pair of side bars are connected by a headed pin.

Figure 7:
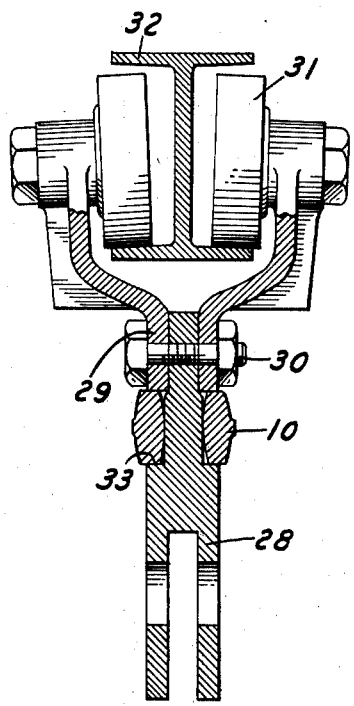
Fig. 7 is a vertical section through the center link and trolley bracket assembly shown in Fig. 5.

As shown in the drawings, the link 10, as heretofore explained, is constructed as a forging and is of the general form of a flat bar-like structure in the form of an elongated link having side walls 11 and curved end sections 12 which enclose an open elongated slot 13.

The link 10 is of symmetrical construction in that both halves of the link considered either from the transverse central plane or the longitudinal central plane are identical in configuration.

As shown most clearly in Fig. 1 of the drawings, the top and bottom faces of the link adjacent to the curved end section 12 are provided with a convex curvature as indicated by the reference character 14. The purpose of this curvature is to provide a rounded surface upon which the inner faces of the adjacent side links of the chain bear so that when the chain is passing around a vertical curve or bend in the conveyor's line of travel, relative movement between the side bars and ends of the center links may occur without undue binding or cramping such as would occur if the top and bottom faces of the thickened end portions of the center link were flat and in relatively close contacting engagement with the flat inner faces of the side bars as shown in the said Weston patent.

It will also be noted by referring to Fig. 1 of the drawings that the top and bottom faces of the center link are also curved or bellied outwardly at the center thereof, as indicated by the reference character 15, and that this outwardly convex portion is connected to the convexly curved portion 14 by curved portion 16 of fairly large radius and so that the adjacent outwardly curved sections 14 and 15 are merged with the curved sections 16 in such a way that no sharp dividing line or line of demarcation is formed such as would provide a line of cleavage.

When the chain is to be used as a part of an overhead trolley installation, the load carrying member 28 is inserted through the elongated slot 13 of a center link 10 and a pair of bracket members 29 are bolted together and to the member 28 by means of a bolt 30 which serves to hold the pair of bracket members 29 and the member 28 in assembled condition, the bolt 30 not only serving to hold the trolley wheels 31 of the bracket in engagement with the supporting I-beam track member 32, but also to hold the brackets 29 and member 28 securely united with the center link 10 of the chain. The lower faces of the trolley bracket members 29 form shoulders which abut against the top faces of the side walls 11 of the center link 10 while the lower faces of the said side walls abut with a shoulder 33 formed on each side of the load-supporting member 28; the engagement of the shoulders on the brackets and member 28 serving to secure the chain to the brackets and maintain said chain in properly spaced relationship to the supporting track 32. As will be noted from an inspection of Fig. 5, the lower faces or shoulders of the trolley brackets 29 and the upper faces of the shoulders 33 hold the chain properly spaced below the track 32 with the chain link 10 in proper driving relationship with the brackets 29. It will be seen from Fig. 5 that the lower faces of the trolley bracket 29 and the upper face of the shoulder 33 formed on the member 28 are curved to cooperate with the outwardly bellied central portion 15 of the link; the similarly curved portions of the trolley bracket members and of the central portion of the link serving to automatically locate the bracket properly centrally of the link and to restrict relative longitudinal movement of the parts after the brackets and link members have been secured together in assembled condition. It will be noted that such action will prevent the bracket members from sliding longitudinally into engagement with the ends of the side bars 26, which engagement would otherwise interfere with the proper articulation of the chain in traveling over curved portions of the track especially in the case of vertical curves where one of the side bars 26 must assume a position more advanced than the other side bar relative to the adjacent center link 10.

While I have shown a satisfactory constructional example of the present invention, it will be understood that many changes, variations and modifications of the specific constructional details may be resorted to without departing from the spirit of the appended claims.

I claim:

1. The combination in a trolley conveyor of the type wherein a rivetless propulsion chain consisting of a plurality of alternately arranged center links and pairs of side bars are connected by readily detachable headed connecting pins and said chain is supported at spaced intervals from a supporting track by pairs of load-supporting wheeled trolley brackets and a cooperating load-supporting member which passes through a center link of said chain, said brackets and said load-supporting member being held in assembled relationship with said supporting track and said chain by common fastening means, characterized by the center links of said chain being provided with a thickened central portion formed by symmetrical outwardly and uniformly curved surfaces on the top and bottom of the side walls thereof, and said brackets and load-supporting member having symmetrical uniformly and inwardly curved shoulders for engaging the outwardly curved surfaces of said side link, thereby serving to locate said brackets and load-supporting members substantially centrally of the said link when said parts are secured together in assembled condition.

2. In combination a trolley conveyor bracket and a propulsion chain, said chain comprising alternately arranged center links and pairs of side bars connected at their respective ends by readily detachable headed connecting pins, said side bars being provided with recesses forming seats for the heads of said pins, said center links being provided with relatively thick ends for holding said side bars in a laterally spaced position such as to cause said heads to become seated in said recesses when said chain is in its normal assembled and extended position and with relatively thin sections adjacent said ends for permitting said side bars to be moved more closely together during assembly and disassembly, the central portion of said center link being formed with symmetrical outwardly and uniformly curved surfaces on the top and bottom of the side walls thereof, said bracket being provided with cooperating inwardly curved shoulders for engaging the outwardly curved surfaces of said center link, thereby serving to locate said brackets substantially centrally of said center link in a manner whereby said brackets will be held away from contact with adjacent links which are required to articulate relative to the links supportingly engaged by said brackets.

ALEXIS W. LEMMON.

REFERENCES CITED

The following references are of record in the file of this patent:

UNITED STATES PATENTS

| Number | Name | Date |
|---|---|---|
| 1,702,803 | Webb | Feb. 19, 1929 |
| 1,721,759 | Webb | July 23, 1929 |
| 1,906,097 | Pribil | Apr. 25, 1933 |
| 2,411,906 | Suman | Dec. 3, 1946 |